United States Patent
Pena

(10) Patent No.: US 10,035,449 B2
(45) Date of Patent: Jul. 31, 2018

(54) DEFORMABLE WHEEL PAD FOR SECURING A STANDING MOTORCYCLE

(71) Applicant: Eddie J. Pena, Rio Rancho, NM (US)

(72) Inventor: Eddie J. Pena, Rio Rancho, NM (US)

( * ) Notice: Subject to any disclaimer, the term of this patent is extended or adjusted under 35 U.S.C. 154(b) by 35 days.

(21) Appl. No.: 14/961,733

(22) Filed: Dec. 7, 2015

(65) Prior Publication Data

US 2016/0280119 A1   Sep. 29, 2016

Related U.S. Application Data

(60) Provisional application No. 62/138,340, filed on Mar. 25, 2015.

(51) Int. Cl.
*B60P 3/075* (2006.01)

(52) U.S. Cl.
CPC .................. *B60P 3/075* (2013.01)

(58) Field of Classification Search
CPC ........................................... B60P 3/075
USPC .............................. 224/567, 924
See application file for complete search history.

(56) References Cited

U.S. PATENT DOCUMENTS

| | | | |
|---|---|---|---|
| 3,104,195 A * | 9/1963 | Warnberg | A47G 27/0225 428/138 |
| 4,090,537 A * | 5/1978 | Bollman | H01B 13/01227 140/92.1 |
| 5,376,127 A * | 12/1994 | Swanson | A61F 2/78 264/511 |
| 5,639,067 A | 6/1997 | Johnson | |
| 6,171,034 B1 | 1/2001 | Burgoon et al. | |
| 6,715,972 B2 | 4/2004 | Jackson | |
| 6,761,519 B2 | 7/2004 | Alderman | |
| 6,966,732 B2 | 11/2005 | Gohata | |
| 6,981,694 B2 | 1/2006 | Carnahan | |
| 8,172,491 B1 | 5/2012 | Stubbs | |
| 2006/0186162 A1 | 8/2006 | Stubbs | |
| 2007/0044906 A1 * | 3/2007 | Park | B29C 47/0023 156/272.2 |
| 2013/0048887 A1 * | 2/2013 | Yoder | G21F 3/00 250/515.1 |
| 2017/0079238 A1 * | 3/2017 | Renforth | A01K 1/033 |

* cited by examiner

Primary Examiner — Peter Helvey
(74) Attorney, Agent, or Firm — The Keys Law Firm PLLC

(57) ABSTRACT

A deformable wheel pad for receiving a wheel of a vehicle and assisting in securing the received wheel in place on a cargo bed or other transporting surface includes a multilayered pad member having a top layer constructed of an elastic material, a middle layer constructed of a rigid material, and a bottom layer constructed of a an elastic material, with layers arranged on top of one another. When the pad member is placed on the cargo bed of a convention truck or trailer, the top layer can contour its shape to grip a wheel which has been strapped thereto and bottom layer's forms to and grips factory bed ribs. The elasticity of the top layer and the bottom layer, with the middle layer disposed therebetween, provides two discrete shock absorption surfaces.

4 Claims, 3 Drawing Sheets

DEFORMABLE WHEEL PAD FOR SECURING A STANDING MOTORCYCLE

CROSS REFERENCE TO RELATED APPLICATIONS

This application claims the benefit of and incorporates by reference U.S. provisional patent application Ser. No. 62/138,340 filed Mar. 25, 2015.

BACKGROUND OF THE INVENTION

Field of the Invention

This invention relates generally to an article retaining device and, more particularly, to a truck bed pad that suitable for securing the wheels of a motorcycles, thereby enabling the motorcycle to be more securely held in place.

Description of the Prior Art

The use of flat cargo bed trucks or trailers to transport motorcycles over long distances is well known. A problem which still exists, however, is that many conventional techniques for securing the wheel(s) of a motorcycle to a cargo bed require its wheels to be tied down through holes that have been drilled or are otherwise present in the cargo bed. Thus, there remains a need for a deformable wheel pad which can be placed on a cargo bed and receive the wheel of a motorcycle to be transported. It would be helpful if such a deformable wheel pad was structured to provide shock absorption so as to mitigate loosening of tie down materials used in transporting the motorcycle. It would be additionally desirable for such a deformable wheel pad to be adapted to adjust to the shape of the cargo bed.

The Applicant's invention described herein provides for a deformable wheel pad adapted to be placed on a cargo bed and receive the wheel of a motorcycle to be transported on the cargo bed. The primary components in Applicant's deformable wheel pad are a multilayered pad member and handles. When in operation, the deformable wheel pad enables a motorcycle to be more securely tied down on a cargo bed. As a result, many of the limitations imposed by prior art structures are removed.

SUMMARY OF THE INVENTION

A deformable wheel pad for receiving a wheel of a vehicle and assisting in securing the received wheel in place on a cargo bed or other transporting surface. In one embodiment, the deformable wheel pad comprises a single, multilayered pad member having a top layer constructed of an elastic material having a light durometer, a middle layer constructed of a rigid material having a hard durometer, and a bottom layer constructed of a an elastic material having a light durometer, with first layer arranged on top of the second and the second on top of the third. Accordingly, when the pad member is placed on the cargo bed of a convention truck or trailer, the top layer can contour its shape to grip a wheel which has been strapped thereto and bottom layer's forms to and grips factory bed ribs. Furthermore, the elasticity of the top layer and the bottom layer, with the middle layer disposed therebetween, provides two discrete shock absorption surfaces that will improve the hold of a conventional ratchet used to secure a wheel in place on the pad member on the cargo bed.

In another embodiment, the deformable wheel pad comprises a first multilayered pad member attached to a second multilayered pad member.

It is an object of this invention to provide a deformable wheel pad which can be placed on a cargo bed and receive the wheel of a motorcycle to be transported.

It is another object of this invention to provide a deformable wheel pad structured to provide shock absorption so as to mitigate loosening of tie down materials used in transporting the motorcycle.

It is yet another object of this invention to provide a deformable wheel pad adapted to adjust to the shape of the cargo bed.

These and other objects will be apparent to one of skill in the art.

DETAILED DESCRIPTION OF THE INVENTION

Figure 1:
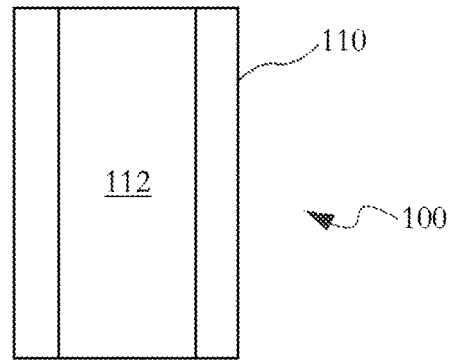
FIG. 1 is a top plan view of a deformable wheel pad built in accordance with a back wheel embodiment of the present invention.
Figure 2:
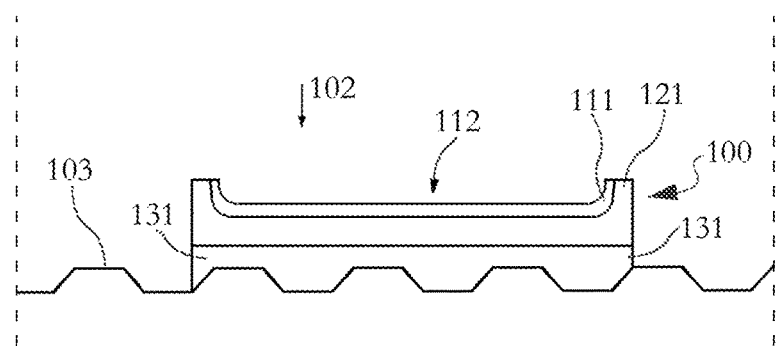
FIG. 2 is back elevational view of a cross section of a deformable wheel pad built in accordance with a back wheel embodiment of the present invention in place on a conventional truck bed cover.

Referring now to the drawings and in particular FIGS. 1 and 2, a back tire deformable wheel pad 100 defines a multilayered pad member 110. The pad member 110 defines a top layer 111, a middle layer 121, and a bottom layer 131 arranged on top of one another. The top layer 111 is constructed of an elastic material having a light durometer, such as an urethane rubber, and includes a wheel groove 112 in its surface. Due to its constituent material and the wheel groove 112, the top layer 111 is adapted to receive a conventional wheel 101, such as a wheel of a motorcycle, and slightly form around the edge of the wheel 101 when pressure in a securing direction 102 is supplied.

It is appreciated that pressure in a securing direction 102 may be supplied by the weight of the vehicle to which the received wheel is attached, from manual action (such as a ratchet or securing mechanism), or both.

The middle layer 121 layer is constructed of a rigid material having a hard durometer, thereby supplying rigidity to the pad member 110. The bottom layer 131 is constructed of an elastic material having a light durometer. When the pad member 110 is placed on the cargo bed 103 of a convention truck or trailer, it is contemplated that the bottom layer's 131 properties will enable it to form to and grip factory bed ribs (or other texture surface) in such a cargo bed. Furthermore, it is appreciated that the elasticity of the top layer 111 and the bottom layer 131, with the middle layer 121 disposed therebetween, provide two discrete shock absorption surfaces that will improve the hold of a conventional ratchet used to secure a wheel 101 in place on the pad member 100 on the cargo bed 103. Accordingly, a wheel 101 secured to a cargo bed 103 while in place on the pad member 100 will more sufficiently resist becoming loosened from the transporting vehicle hitting bumps in the road or otherwise being displaced.

Figure 3:
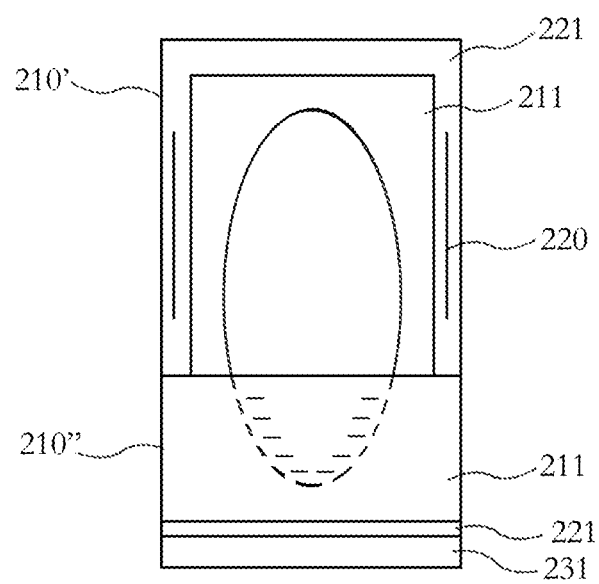
FIG. 3 top plan view of a deformable wheel pad built member in accordance with a front wheel embodiment of the present invention.
Figure 4:
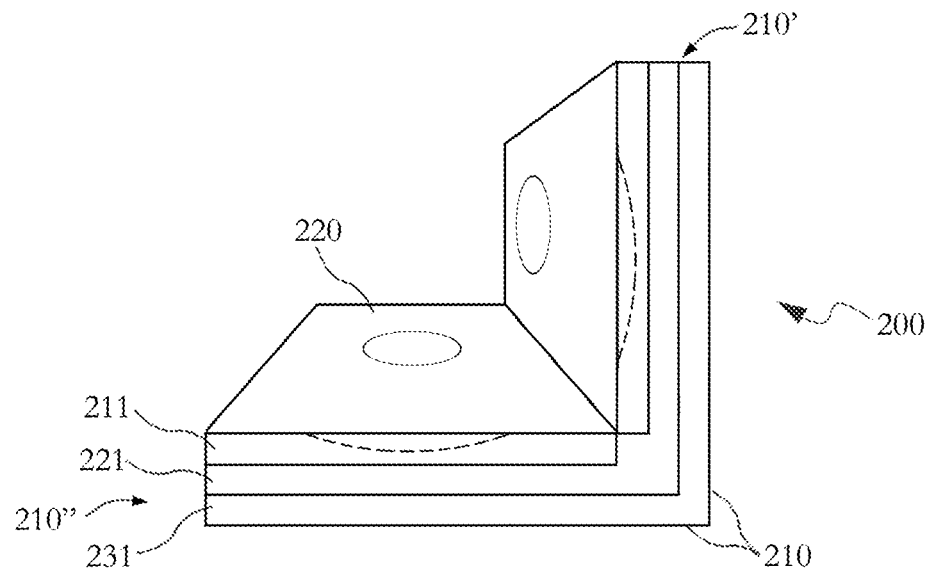
FIG. 4 is side elevational view of a deformable wheel pad built member in accordance with a front wheel embodiment of the present invention with its tire grooves in shadow.
Figure 5:
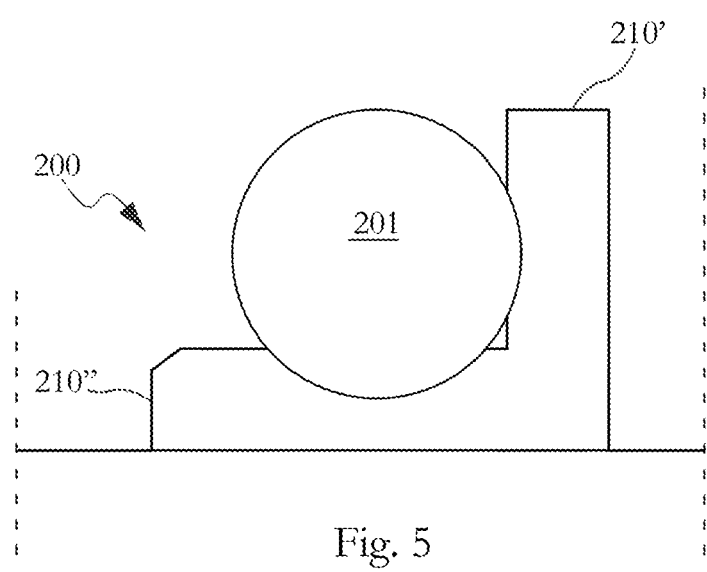
FIG. 5 is side elevational view of a cross section of a deformable wheel pad built in accordance with a double pad embodiment of the present invention with a tire in place thereon.

Referring now to FIGS. 3-5, a front wheel deformable wheel pad 200 defines a first multilayered pad member 210' attached to a second multilayered pad member 210". In the preferred embodiment, the first multilayered pad member 210' and the second multilayered pad member 210" (collectively referred to as pad members 210) are connected to one another at one end in an "L" shaped orientation. Each pad member 210 defines a top layer 211, a middle layer 221, and a bottom layer 231 arranged on top of one another, with a pair of handle elements 220 attached to either side. It is contemplated that the layers of each pad member 210 are configured in essentially the same manner as in the pad member in the single pad embodiment of the present invention.

Advantageously, the front wheel deformable wheel pad 200 allows a wheel 201 to be placed in contact with and wedged against two discrete shock absorbing surfaces.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A deformable wheel pad for securing a vehicle wheel to a base surface, comprising:
   a pad member having a discrete first layer positioned against and on top of a discrete second layer and a discrete third layer positioned against and underneath the second layer, wherein said third layer forms a bottom of the pad member;
   wherein said second layer is constructed of a rigid material and said first layer and said second layer each include two raised edges on opposing sides of a depressed inner area; and
   wherein said third layer is adapted to grip contours in a base surface when pressure in a securing direction is supplied; wherein said first layer is constructed of an elastic material having a first durometer, thereby enabling said first layer to receive a vehicle wheel and form around the edges of a vehicle wheel received when pressure in a securing direction is supplied.

2. The deformable wheel pad of claim 1, wherein said third layer is defined by a bottom elastic portion.

3. A deformable wheel pad for securing a vehicle wheel to a base surface, comprising:
   a pad member having a discrete first layer positioned against and on top of a discrete second layer and a discrete third layer positioned against and underneath the second layer, wherein said third layer forms a bottom of the pad member;
   wherein said second layer is constructed of a rigid material and said first layer and said second layer each include two raised edges that extend completely across the pad member and on opposing sides of a depressed inner area; and
   wherein said third layer is adapted to grip contours in a base surface when pressure in a securing direction is supplied; wherein said first layer is constructed of an elastic material having a first durometer, thereby enabling said first layer to receive a vehicle wheel and form around the edges of a vehicle wheel received when pressure in a securing direction is supplied.

4. The deformable wheel pad of claim 3, wherein said third layer is defined by a bottom elastic portion.

* * * * *